UNITED STATES PATENT OFFICE.

LOUIS BROWN, OF RYE, NEW YORK.

MIXED PAINT.

SPECIFICATION forming part of Letters Patent No. 328,643, dated October 20, 1885.

Application filed September 8, 1884. Serial No. 142,547. (Specimens.)

*To all whom it may concern:*

Be it known that I, LOUIS BROWN, of Rye, in the county of Westchester, in the State of New York, a citizen of the United States, have invented a new and useful Improvement in Paint Compositions for and Process of Metal Coating for Wood and Other Articles, of which the following is a full, clear, and exact description.

I have discovered that the material known as "sand-iron" ore when properly treated can be combined with a suitable vehicle to form a composition which is non-corrosive and has great fire-proof and protective qualities. This sand-iron ore in its natural state is generally found mixed with silica, sand, or emery, and is separated therefrom in a number of ways, which it is unnecessary to further describe here, as the various processes employed are matters of common knowledge. While the sand-iron ore, after separation from the silica or emery or other substance with which it is naturally found, is in a comparatively fine state, it is not fine enough for use in the said composition, and I therefore pulverize it either by crushing it or by attrition, and for this purpose I may use the machine known as "Alsing's Patent Pulverizing-Cylinder." It is immaterial, however, what machine or process is used for reducing the sand-iron ore to the powdered state, and it is sufficient to say that the finer or finer powdered it is the better or smoother the composition will be. This pulverized or powered sand-iron ore forms the base of the composition. The carrying body can be of any of the well-known vehicles; and I would mention, among others, linseed, fish, or other oils, varnish, a mixture of soap, water and glue, turpentine, or any solution of asphalt, bitumen, tar, &c.

Of course it is not necessary that the entire body of the composition be of the comminuted sand-iron ore, and there may be used in connection therewith any of the ordinary pigments or bases of the market—such as whiting, Paris white, ochers, &c.—both for the purpose of filling and for the purpose of coloring; and the proportion of the powdered sand-iron ore to the remainder of the body may be varied to suit the requirement of the use to which the particular composition is to be put, or the fancy of the user. I should say, however, that when supplemental or coloring bodies, or both, are used, it would be desirable to employ anywhere from thirty to seventy per cent. of the powdered sand-iron ore, although a smaller or larger quantity might be used.

I have now described the essential features of my invention.

Of course any of the ordinary chemical coloring-matters may be used for coloring the composition, and any suitable drier may be employed. The composition thus prepared is applied by a brush, by rolls, by dipping, or in any other suitable mechanical way; and I would say that it can be used upon the surface of wood, metal, iron, steel, paper, pasteboard, stone, brick, pottery, textile fabrics, &c., to form a layer, lacquer, or coating of non-corrosive iron, and the article upon which it is applied or used will be entirely protected from extraneous influences, and the coating will be very tenacious and coherent.

I am aware of the Patent No. 145,130, granted to Carl A. Sitzler, dated December 2, 1873, for an improvement in paint compounds, which describes as one of the ingredients of the paint composition pulverized metallic iron twenty parts; but I would say that I do not use what is known as "metallic iron" in my composition, for such iron rapidly attracts oxygen from the atmosphere or from water, and forms red oxide of iron or iron rust, which is one of the things my paint is intended to prevent. The powdered sand-iron ore which I employ in my composition is not metallic iron, so known, but magnetic black oxide of iron, containing all the iron in fixed combination with oxygen, and in a non-corrodible condition; and I therefore consider that the Sitzler patent does not describe the essential features or elements of my invention.

Having thus fully described my invention, I claim and desire to secure by Letters Patent of the United States—

A paint composition made of powdered sand-iron ore of the character herein specified, combined with whiting or other coloring or filling matter, as set forth, and a vehicle substantially as described.

LOUIS BROWN.

Witnesses:
P. K. DUMARESQ,
DAVID JONES.